United States Patent [19]

Hashimoto

[11] Patent Number: 5,120,084

[45] Date of Patent: Jun. 9, 1992

[54] CONNECTION STRUCTURE FOR BRANCHING CONNECTOR IN HIGH-PRESSURE FUEL RAIL

[75] Inventor: Yoshiyuki Hashimoto, Shizuoka, Japan

[73] Assignee: Usui Kokusai Sangyo Kaisha Limited, Japan

[21] Appl. No.: 588,367

[22] Filed: Sep. 26, 1990

[30] Foreign Application Priority Data

Sep. 27, 1989 [JP] Japan .................. 1-251101

[51] Int. Cl.⁵ ............................. F16L 41/08
[52] U.S. Cl. .................. 285/156; 285/332; 285/334.4; 285/332.2
[58] Field of Search .................. 285/332, 332.2, 332.1, 285/332.3, 156, 334.4

[56] References Cited

U.S. PATENT DOCUMENTS

| | | |
|---|---|---|
| Re. 6,488 | 6/1875 | Van Duzer . |
| 966,870 | 8/1910 | Stoddard . |
| 2,098,669 | 11/1937 | Moffitt . |
| 2,360,359 | 10/1944 | Meyers . |
| 3,063,674 | 5/1962 | Branin . |
| 3,437,357 | 4/1969 | Rubin . |
| 3,955,835 | 5/1976 | Farrington ............... 285/332 X |
| 4,073,513 | 2/1978 | Blakely . |
| 4,540,205 | 9/1985 | Watanabe . |
| 4,832,376 | 5/1989 | Sugao . |
| 4,893,601 | 1/1990 | Sugao . |
| 4,900,180 | 2/1990 | Takikawa . |

FOREIGN PATENT DOCUMENTS

| | | | |
|---|---|---|---|
| 1937975 | 2/1971 | Fed. Rep. of Germany | 285/332 |
| 2334445 | 5/1974 | Fed. Rep. of Germany . | |
| 2269020 | 11/1975 | France | 285/332 |
| 143432 | 5/1920 | United Kingdom | 285/332.3 |
| 669111 | 3/1952 | United Kingdom | 285/332 |

*Primary Examiner*—Randolph A. Reese
*Assistant Examiner*—Heather Chun
*Attorney, Agent, or Firm*—Anthony J. Casella; Gerald E. Hespos

[57] ABSTRACT

Possible penetration into the pressure bearing surface of the pressure head portion of the branching connector when the pressure bearing surface is connected in abutting engagement to the pressure receiving bearing surface of the fuel rail is prevented by providing a relief portion at least on both sides

15 Claims, 10 Drawing Sheets

PRIOR ART

CONNECTION STRUCTURE FOR BRANCHING CONNECTOR IN HIGH-PRESSURE FUEL RAIL

BACKGROUND OF THE INVENTION

1. Field of the Invention

The present invention relates to a connection structure for a branching connector like a branch pipe, a branch fitting, etc. in a fuel rail such as a high-pressure fuel manifold and a high-pressure fuel block, and more particularly to a connection structure in a branching connector in a high-pressure fuel rail serving to pass a fuel under a pressure exceeding 1,000 kgf/cm$^2$ to an internal combustion diesel engine.

2. Description of the Prior Arts

FIG. 10 shows a conventional type of connection structure for a branching connector such as a branch pipe in a manifold serving as a high-pressure fuel rail, wherein a branch pipe (13) is inserted in a straight hole (12) formed in a high-pressure fuel main pipe (11) perpendicularly to the axis of the pipe and welded together in the joined state.

In the connection structure of this nature, however, the welded portions (14) are liable to be embrittled possibly to the extent of entailing the phenomenon of of fuel scatter or the separation of the branch pipe (13) in some cases because the welded portions by nature are exposed to repeated application of an ultra-high fluid pressure frequently exceeding 1,000 kgf/cm$^2$ and to incessant exertion of vibrations generated by the engine.

In place of said connection structure and in order to resolve the problem involved therein, a connection structure in which branch pipes are mechanically connected to a main pipe by means of a concavo-convex fitting was proposed by the present application in the U.S. Pat. No. 4946205.

In the proposed connection structure as illustrated in FIG. 11, a connection head portion (18) shaped in the form of a truncated cone on the connection terminal of a branch pipe (17) is pressed via a bowl-like sealing member (19) into tight contact with the pressure receiving bearing surface being an inner peripheral surface of a branch hole (15) formed in the shape of an inverted cone in a main pipe (11), said connection head portion being fastened with a nut (20).

In the connection structure of such a concavo-convex system, the sealing effect is much greater than the connection structure shown in FIG. 10, but as illustrated in FIG. 12, as the nut (20) is increasingly tightened, the bowl-like sealing member (19) is penetrated by the outer peripheral edge (21) of the pressure receiving bearing surface and possibly deformed by tension from the connecting head portion (18), thus causing clearance between the bearing surface and the sealing member. And as illustrated in FIG. 13, when the connection head portion (18) is caused to tilt or move eccentrically, one end of the portion may be penetrated by the outer peripheral edge (21) to cause deformation, while the other end may be lifted from the branch hole (16) to cause clearance, thus making it impossible to obtain the desired surface pressure despite increased tightening torque produced by the nut (20). This is because the tightening torque generated by the nut 20 does not normally work as thrust force on account of the bite by the outer peripheral edge (21) into the connection head portion (18) on one side.

In FIGS. 12 and 13, if clearance is produced between the sealing member (19) and the pressure receiving bearing surface or between the connection head portion (18) and the bearing surface, the fuel inside may spatter through the gap or the branch pipe (17) may be separated.

SUMMARY OF THE INVENTION

In view of the situation described above, an object of this invention is to provide a connection structure for a branching connector that permits a greater sealing effect to be obtained by preventing deformation due to the bite by the outer peripheral edge into the pressure surface of the pressure head portion or the sealing member in the connection structure for a concavo-convex fitting.

In order to achieve this object, the present invention is directed to the connection structure for a branching connector in a high-pressure fuel rail in which through holes are formed at a plurality of positions in the axial direction in the peripheral wall of a flow passage formed axially in said rail and serving to pass a high-pressure fuel and in which outwardly opening pressure receiving bearing surfaces are formed in each of said through holes so that branching connectors having a flow path communicating with said flow passage are provided. The pressure receiving bearing surfaces of each through hole are abutted by each of the pressure head portions formed on the connection terminals of said braching connectors which come in contact with said fuel rail. The connection structure is so designed that said pressure receiving bearing surfaces each are formed on the surface of revolution on the axis of said through holes, said pressure head portions each are formed on the surface of revolution so that the line of contact with said surface of revolution is circular, and a relief portion is provided at least on both sides of the outwardly opening edge of said pressure receiving bearing surfaces in the longitudinal direction in said fuel rail.

In the first aspect of the present invention, said relief portion consists of two tapers of different angles of inclination, the outer taper of which is set at a more gentle gradient than the inner taper, and in the second aspect, said relief portion consists of substantially circular arc surfaces.

It is to prevent deformation due to the bite of the outer edge of the pressure receiving bearing surface into the pressure bearing surface or the sealing member and to ensure reliable sealing of the contacted areas by keeping circular contact between the pressure bearing surface or the sealing member and the pressure receiving bearing surface that the relief portion is provided making the pressure receiving bearing surface double-tapered with the outer taper inclined more gently than the inner one, or shaping the outwardly opening peripheral surfaces substantially in the form of a circular arc.

Namely, since the bite into the pressure bearing surface on the pressure head portion of the branching connector or into the sealing member is precluded, surface pressure on the sealing surface is sufficiently built up (thrust force produced by the fast union of the branching connector or by the nut incorporated in the connector is sufficiently transmitted to said sealing surface) to give a high level of sealing, thus making the branching connector capable of withstanding any repeated sudden and frequent change in super-high fluid pressure with excellent results.

In connection with the above, it is possible to adopt as one of the mechanical means to connect the branching connector to the fuel rail a system wherein separately produced joint pieces are externally fitted on the fuel rail so as to enclose the pressure receiving bearing surface, allowing the nut incorporated in the branching connector to be tightly meshed with threaded holes in said joint pieces with the pressure head portion inserted therein.

BRIEF DESCRIPTION OF PREFERRED EMBODIMENTS

Figure 1A:
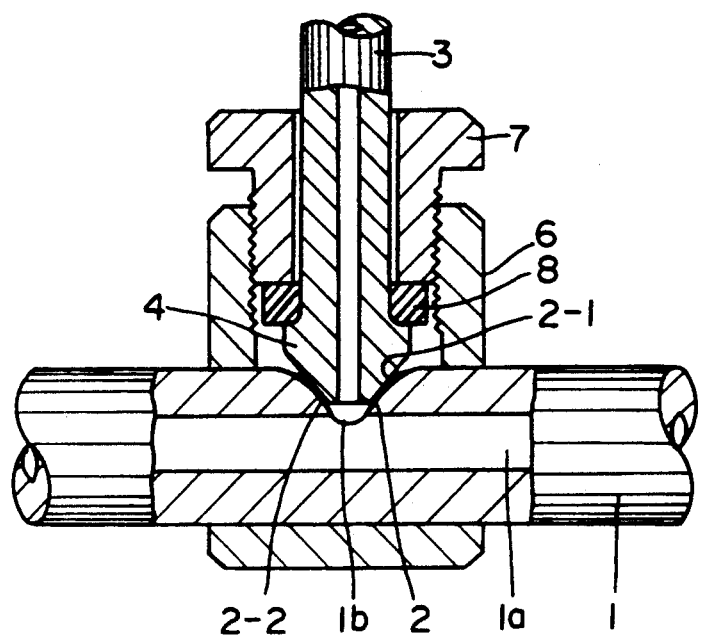
FIGS 1a and 1b are diagrams illustrating the first aspect of the present invention, FIG. 1a being a front view of a longitudinal cross section illustrating the principal part of the aspect and FIG. 1b a magnified view illustrating the pressure receiving bearing surface portion.
Figure 1B:
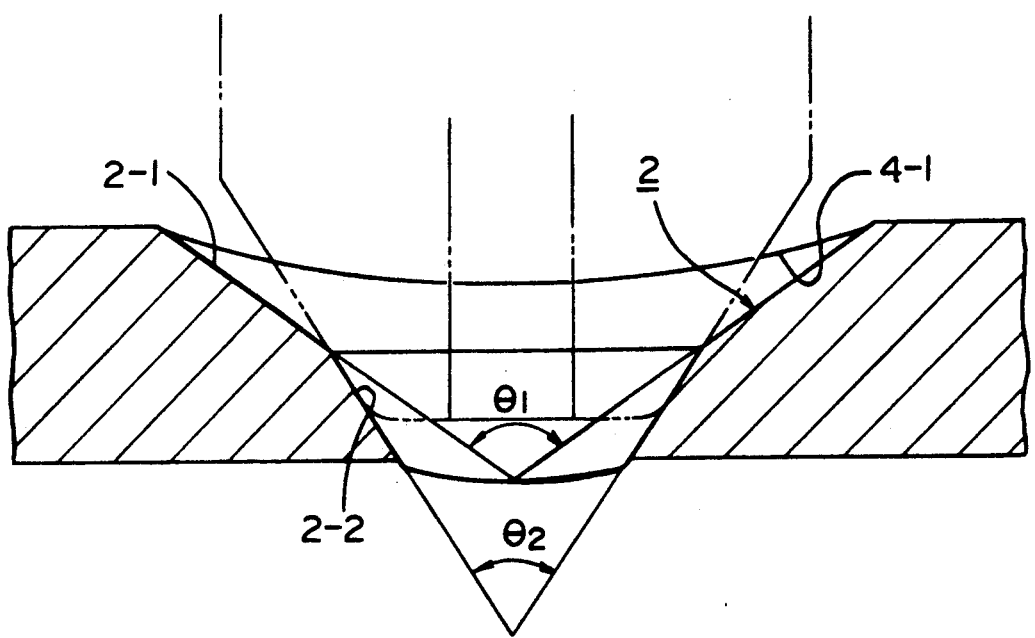

In each of the drawings, the same reference number is used for the same component part. FIGS. 1a and 1b are diagrams illustrating the first aspect of the present invention, FIG. 1a being a front view of a longitudinal cross section illustrating the principal part of the aspect and FIG. 1b a magnified view showing the pressure receiving bearing surface portion. As illustrated in FIG. 1, a comparatively thick-walled metal main pipe (1) with an outside diameter of 20 mm and a wall thickness of 6 mm for instance is used as a fuel rail or a high-pressure fuel manifold serving to pass a high-pressure fuel in the first aspect of the present invention.

In the main pipe (1), a through passage (1a) is formed in the axial direction, and in the peripheral wall of this through passage (1a), through holes (1b) are formed at a plurality of positions in the axial direction. (FIG. 1 shows only one through hole (1b) position.) The through holes (1b) have the respective inner terminal peripheries thereof each shaped in the form of an outwardly opening bearing surface (2) in the radial direction of the main pipe (1), said bearing surface being a substantially conical surface of revolution on the axis of the through holes (1b), such as a conical surface, a circular arc surface of revolution, an elliptical surface of revolution, a hyperbolic surface of revolution, a parabolic surface of revolution, etc.

Figure 2A:
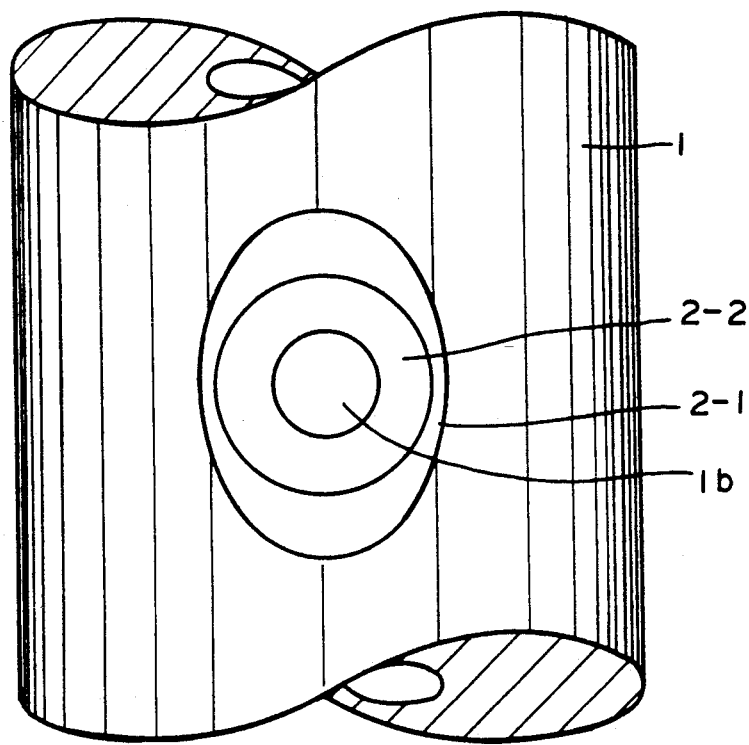
FIGS. 2a and 2b are magnified plans showing embodiments of the pressure receiving bearing surface of the first aspect.
Figure 2B:
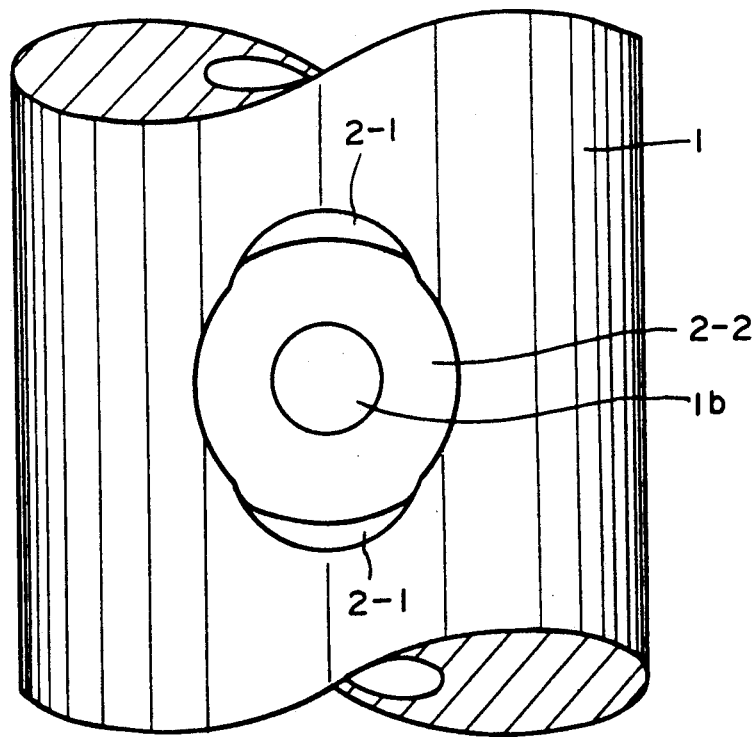

As illustrated in FIG. 1a and 2a, the pressure receiving bearing surfaces (2) are double-tapered with the outer taper surface (2-1) inclined more gently than the inner taper surface (2-2). The taper surface (2-1) may be formed all around the periphery of the taper surface (2-2), but it is an indispensable condition of the present invention that the taper surface (2-1) be formed at least on both sides of the pressure receiving bearing surface (2) in the longitudinal direction as illustrated in FIG. 2b. The angles of inclination ($\theta1$) and ($\theta2$) of the outer taper surface (2-1) and the inner taper surface (2-2) of the pressure receiving bearing surface are not specifically defined, but according to the results of experiments conducted by the present inventor et al., the angles ($\theta1$) and ($\theta2$) are preferably approximately 65° to 120° and approximately 60°, respectively.

Said angles of inclination ($\theta1$) and ($\theta2$) are defined as a vertical angle (an included angle) passing through the axis of the through hole (1b) and formed by lines having an average gradient of the respective lines of the pressure receiving bearing surface (2), that is the outer taper surface (2-1) and the inner taper surface (2-2) intersecting a plane parallel with the axis of the through passage (1a).

On the other hand, a taper surface (4-1) acting as a pressure bearing surface is formed on the pressure head portion (4) on the side of the branch pipe (3) used as a branching connector in the first aspect so that said taper surface can be pressed in concavo-convex fitting against the pressure receiving bearing surface (2) on the side of the main pipe (1), the taper surface (4-1) being a surface of revolution similar to said pressure receiving bearing surface (2). If the taper surface (4-1) of the pressure head portion (4) is conical and the taper surface (2-2) of the pressure receiving bearing surface (2) is also conical, the contact between the two surfaces is a belt-shaped surface contact, but if the taper surface (2-2) is another concave surface of revolution, the contact with the taper surface (4-1) is first a line contact and as the tightening torque of the nut or the like is increased, a strip-like surface contact is obtained. If the taper surface (4-1) of the pressure head portion (4) is a convex surface of revolution, a line contact is achieved first irrespective of the shape of the taper surface (2-2) and as the tightening torque of the nut or the like is increased, a strip-like surface contact is obtained. The branch pipe (3) is disposed in the threaded hole (6a) of a joint piece (6) provided on the main pipe (1) to enclose the pressure receiving bearing surface (2) so that said branch pipe is tightly pressed against said pressure receiving bearing surface (2) via a washer (8) by means of the clamping nut (7).

The joint piece (6) separately produced in the form of a circular ring or angular ring of a small length is externally fitted on the main pipe (1) so as to enclose said pressure receiving bearing surface (2).

The branch pipe (3) and the main pipe (1) are joined by causing the pressure head portion (4) of the branch pipe (3) to be pressed tightly against the pressure receiving bearing surface to of the main pipe (1) by means of said joint piece (6) and allowing the abutting surfaces to be imobilized against each other by means of fast engagement between the nut (7) incorporated in the branch pipe and the threaded hole in the joint piece (6).

Since the pressure receiving bearing surface (2) and the pressure head portion (4) are sealed by metal-tometal contact, no sealing member is required in particular, but it goes without saying that a sealing ring member such as an indium, silver, copper, brass, or aluminium packing may be interposed between the pressure head portion and the pressure receiving bearing surface for greater effect.

In the connection structure of the present invention, the pressure head portion (4) is not penetrated by the outer edge of the pressure receiving bearing surface (2), thus permitting surface pressure on the sealing surface to be sufficiently increased. Therefore, fuel leakage never occurs.

Figure 3A:
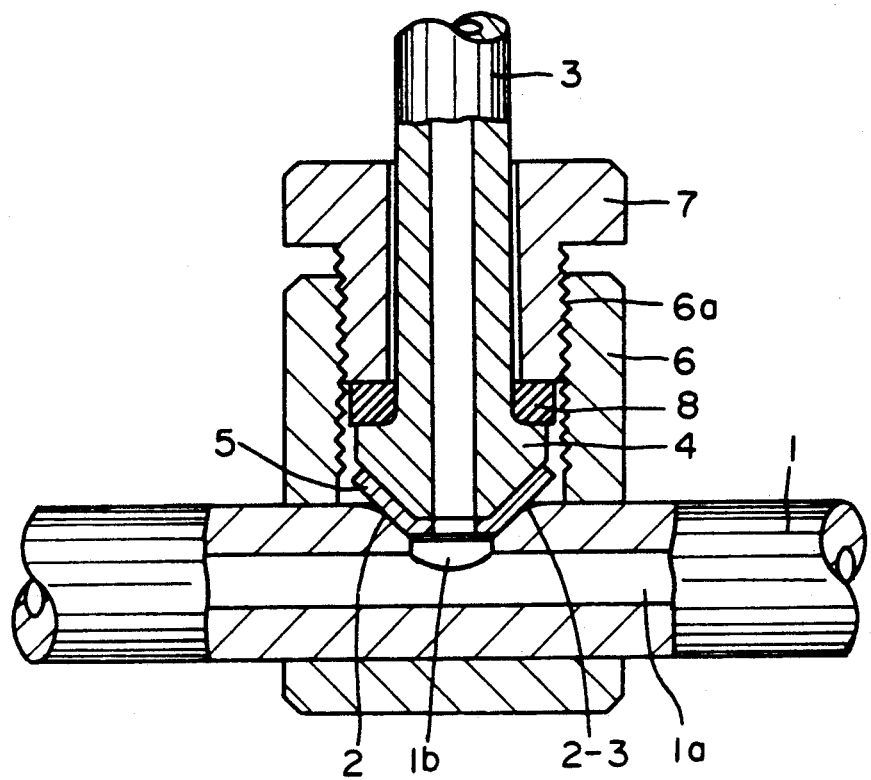
FIGS. 3a and 3b are diagrams illustrating the second aspect of the present invention, FIG. 3a being a front view of a longitudinal cross section showing the principal part of the second aspect and FIG. 3b a magnified diagram showing showing the pressure receiving bearing surface portion.

By reference to FIGS. 3 through 5, the second aspect of this invention will be explained below. Excepting the he shapes of the pressure bearing surface and the pressure receiving bearing surface described hereunder, the construction of the second aspect is substantially the same as that of the first aspect described above.

In a similar way to the first aspect of the present invention, a substantially conical pressure receiving bearing surface (2), a surface of revolution such as a conical surface, a circular arc surface of revolution, an elliptical surface of revolution, a hyperbolic surface of revolution, a parabolic surface of revolution, etc., is formed in the shape of an outwardly opening inner terminal pheripery on the end of the through hole (1b) in the radial direction of the main pipe (1).

The pressure bearing surface (4-1) is a surface of revolution similar to the pressure receiving bearing surface (2). If the pressure bearing surface (4-1) of the pressure head portion (4) is a conical surface and the pressure receiving bearing surface (2) is also conical, the contact with the pressure bearing surface (4-1) is a belt-like surface contact. If the pressure receiving bearing surface (2) is another concave surface of revolution, the contact with the pressure bearing surface (4-1) is first a line contact and as the tightening torque of the nut or the like is increased, a strip-like surface contact is obtained. If the pressure bearing surface (4-1) of the pressure head portion (4) is a convex surface of revolution, a line contact is achieved first irrespection of the shape of the pressure receiving bearing surface (2) and as the tightening torque of the nut or the like is increased, a strip-like surface contact is obtained.

Figure 3B:
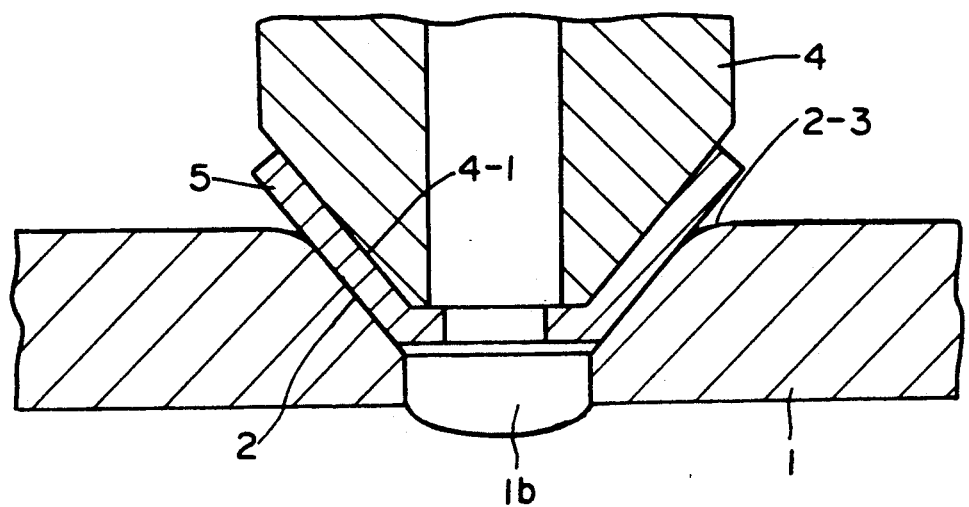
Figure 4A:
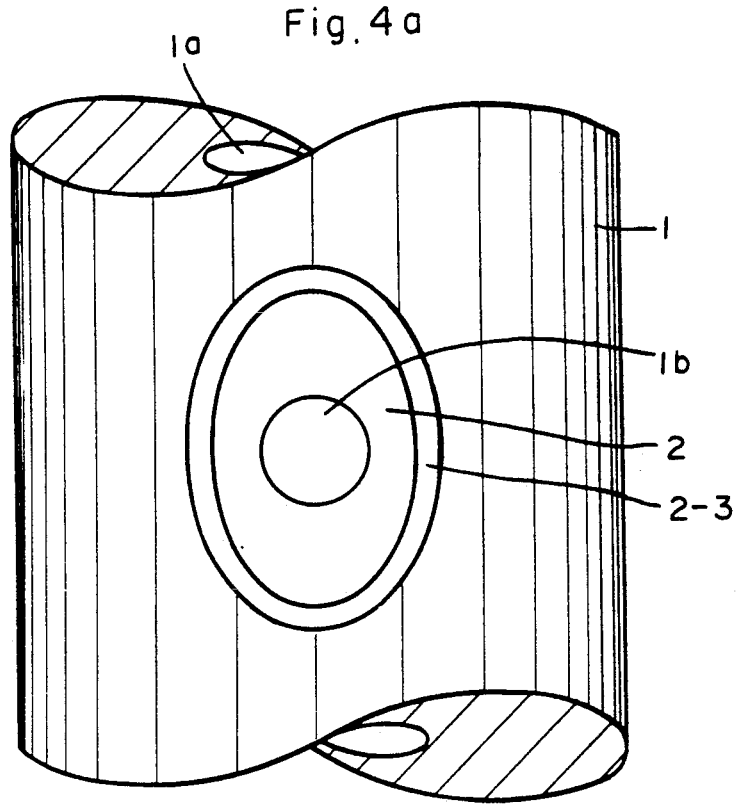
FIGS. 4a and 4b are magnified plans showing embodiments of the pressure receiving bearing surface of the second aspect.
Figure 4B:
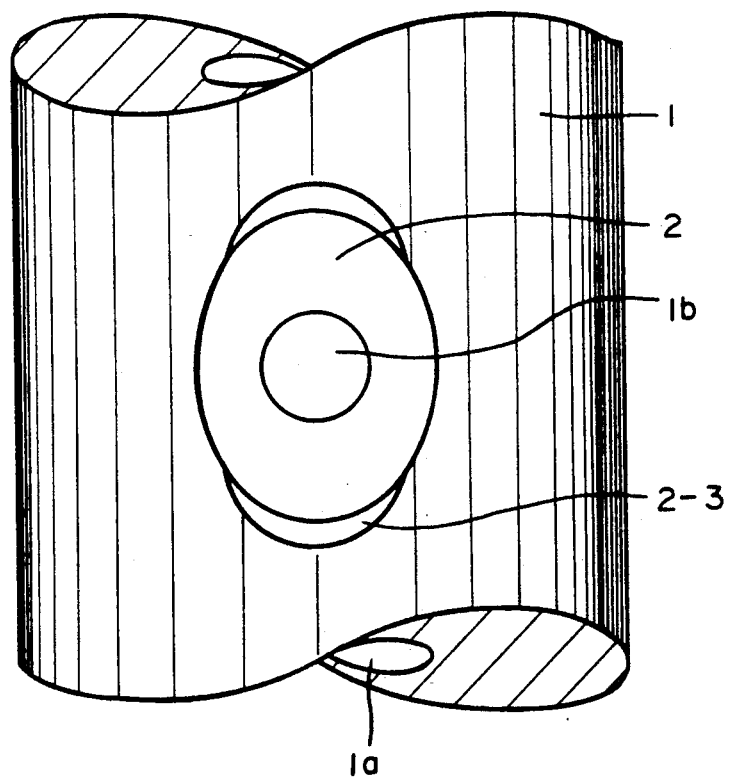
Figure 5A:
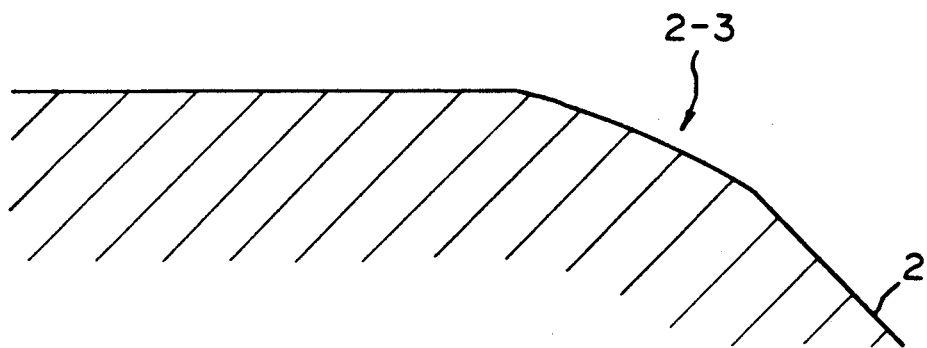
FIGS. 5a through 5c are partially magnified sections showing each embodiment of the substantially circular arc surfaces.
Figure 5B:
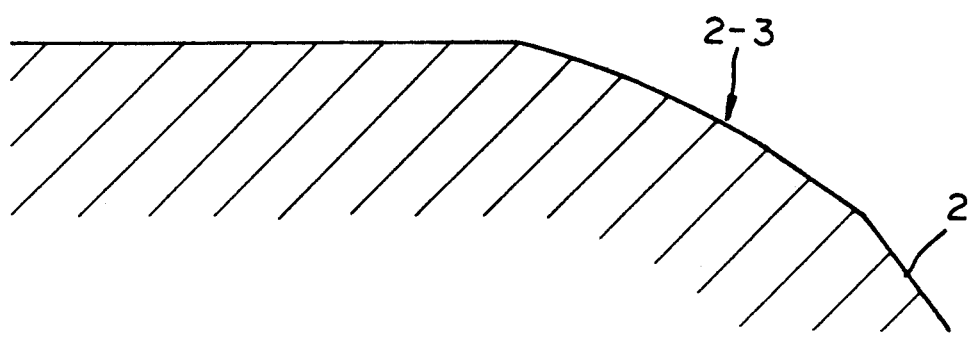
Figure 5C:
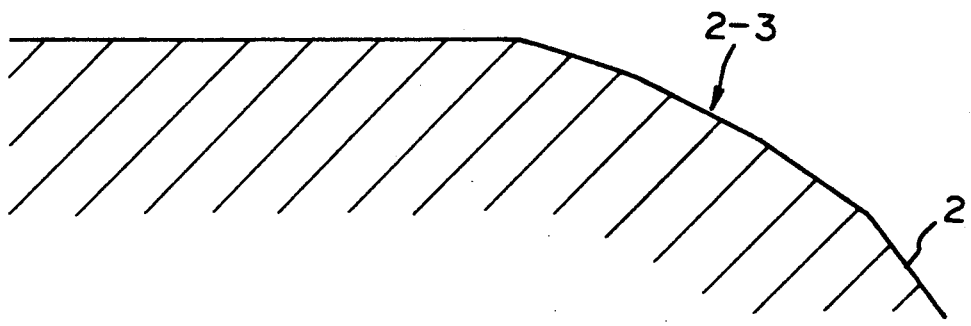

In the second aspect, a substantially circular arc surface (2-3) is formed all around the outwardly opening inner terminal periphery of the pressure receiving bearing surface (2) as illustrated in FIGS. 3b and 1a, but in the present invention, it is an indispensable condition that the circular arc surface (2-3) be formed at least on both sides of the opening terminal in the longitudinal direction as illustrated in FIG. 4b. The profile of this substantially circular arc surface (2-3) may be not only a simple curved line as shown in FIG. 5a, but also a multi-stepped continuity of straight lines as shown in FIG. 5b, or a multi-stepped continuity of curved lines as illustrated in FIG. 5c, and the surface (2-3) may also be disconinuous in relation to the pressure receiving bearing surface (2) and the main pipe (1). In any case, the surfaces are so designed that no penetration into the pressure bearing surface (4-1) or the sealing member (5) occurs when the component parts are assembled.

In the second aspect, the sealing member (5) is tightly pressed between the pressure head (4) and the pressure receiving bearing surface (2) as the nut (7) is increasingly tightened, but since the outwardly opening inner terminal periphery of the pressure receiving bearing surface is formed by the substantially circular arc surface (2-3), the sealing member (5) is pressed without being penetrated by the main pipe. Thus, surface pressure between the pressure receiving bearing surface (2) and the sealing member (5) as well as between the pressure bearing surface (4-1) of the pressure head portion (4) and the sealing member (5) is sufficiently increased for perfect sealing.

Figure 6:
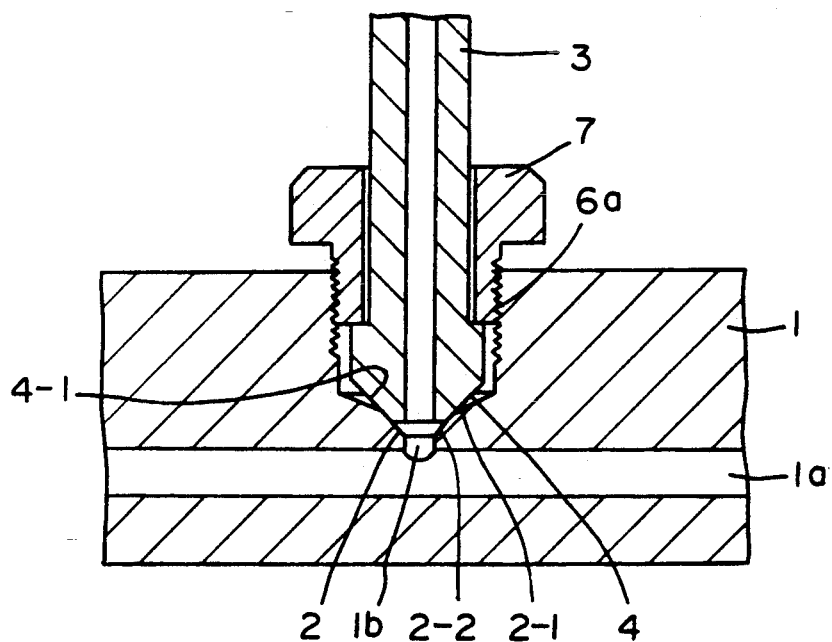
FIGS. 6 through 8 are front views of longitudinal cross sections of the principal parts showing other embodiments of the present invention.

FIG. 6 is a front view of a longitudinal cross section showing the principal part of another embodiment, wherein no joint piece is provided but a through passage (1a) is eccentrically formed in the main pipe (1) with a through hole (1b) communicating with the through passage (1a), a pressure receiving bearing surface (2) having two tapered surfaces (2-1) and (2-2), and a threaded hole (6a) provided in the thicker wall portion of the main pipe (1). A clamping nut (7) is meshed directly with the threaded hole (6a).

According to this embodiment, the connection structure obviates the necessity for centering as otherwise required between the main pipe and a joint piece when the branching connector is fitted, and permits the number of parts to be reduced to make the whole body compact and smaller. The construction, behaviour, and effects of other portions of this embodiment are the same as those of the embodiments already described above.

Figure 7:
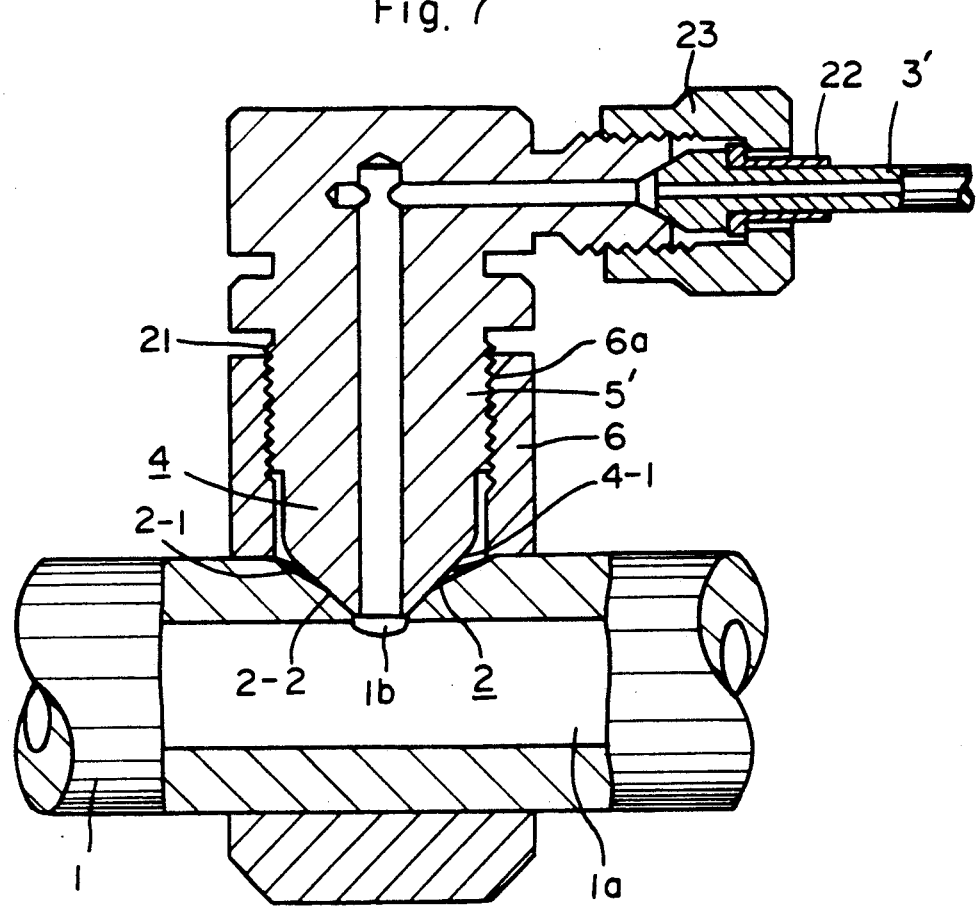

FIG. 7 is a front view of a longitudinal cross section showing the principal part of another embodiment, wherein a branching connector consists of a branching fitting (5') with a main pipe used as a fuel rail. This embodiment takes into consideration such cases where a branch fitting such as an elbow or the like is used, or where mechanisms such as a uniform pressure valve, a reducing valve, a delivery valve, a discharge valve, etc. are incorporated in the branching fitting.

In the embodiment shown in FIG. 7, a branching connector connected to a main pipe 1 consists of a branching fitting (5') which has at its one end a pressure head portion (4) with a surface of revolution formed in a similar way to the embodiment described above. The branching fitting (5') is abutted to and pressed against a pressure receiving bearing surface (2) having two tapered surfaces (2-1) and (2-2) formed in the main pipe 1 by causing a threaded wall (21) formed on the outer periphery of the branching fitting (5') to be meshed with a threaded hole (6a) in a joint piece (6). In the connection structure, a branch pipe (3') is connected and fixed to the other end of the branching fitting (5') by screwing a cap nut (23) via a sleeve (22).

According to this embodiment, the branch pipe (3') can be brought out in the longitudinal direction of the main pipe (1).

Figure 8:
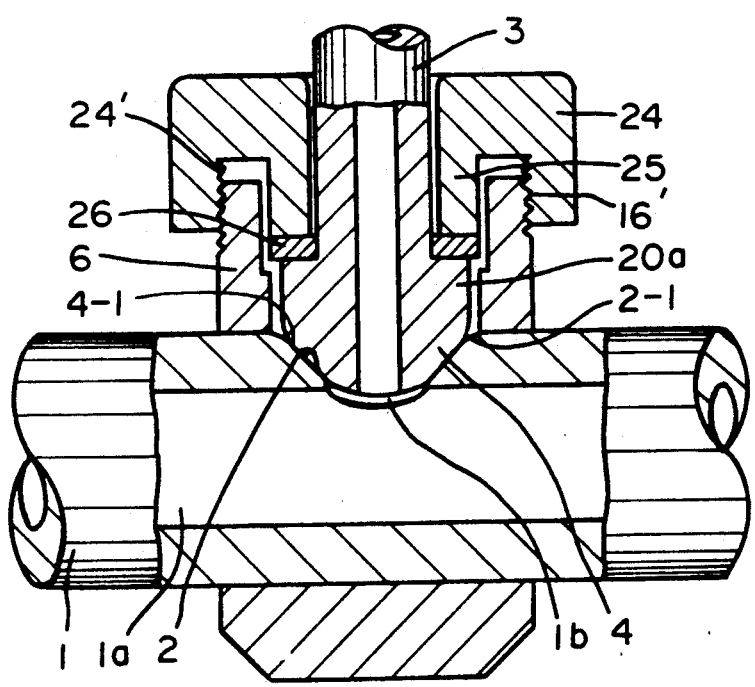

FIG. 8 is front view of a longitudinal cross section showing the principal portion of still another embodiment of the present invention. In this embodiment, a branch pipe (3') which is a branching connector is connected to a main pipe (1) acting as a fuel rail by means of a cap nut (24). On this cap nut, a cylindrical projection (25) is formed at the center. A pressure head portion (4) is abutted and pressed against a pressure receiving bearing surface (2) having a substantially circular arc surface (2-3) on an outwardly opening inner terminal by causing an annular projection (20a) to be pressed down via a washer 26 with the projection (25) as a threaded portion (24') formed on the inner circumference of the cap nut (24) is tightened by having it meshed with a threaded portion (16') formed on the outer circumference of the joint piece (6).

Figure 9:
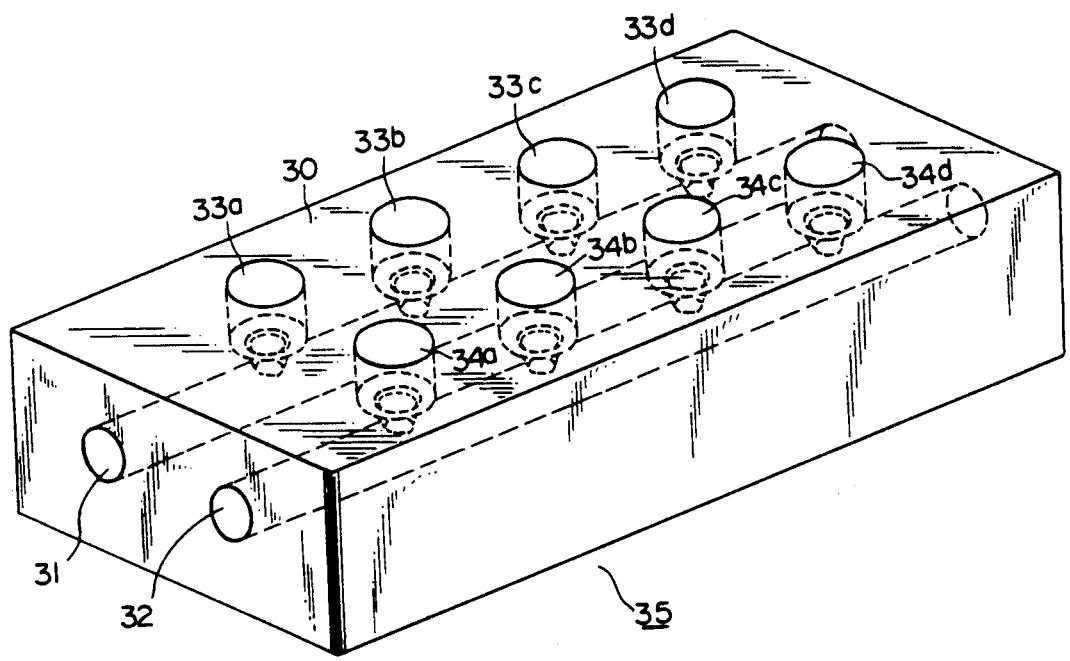
FIG. 9 is an oblique view showing a fuel block used as a fuel rail in the present invention.
Figure 10:
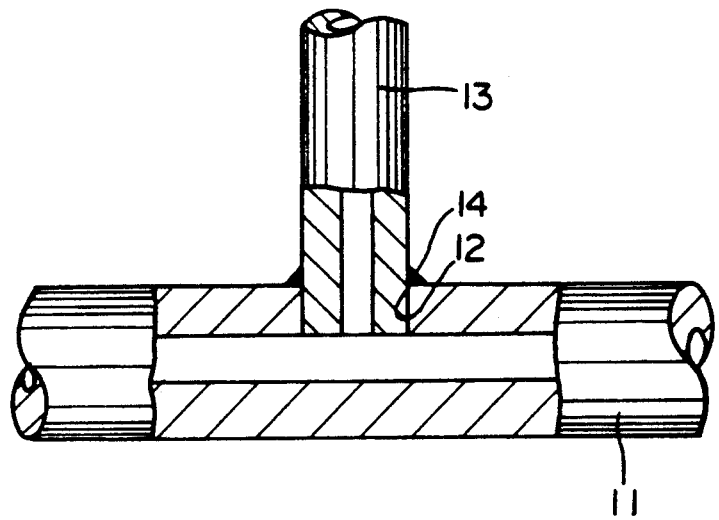
FIGS. 10 and 11 are front views of partially broken-out sections showing examples of connection structure of prior art.
Figure 11:
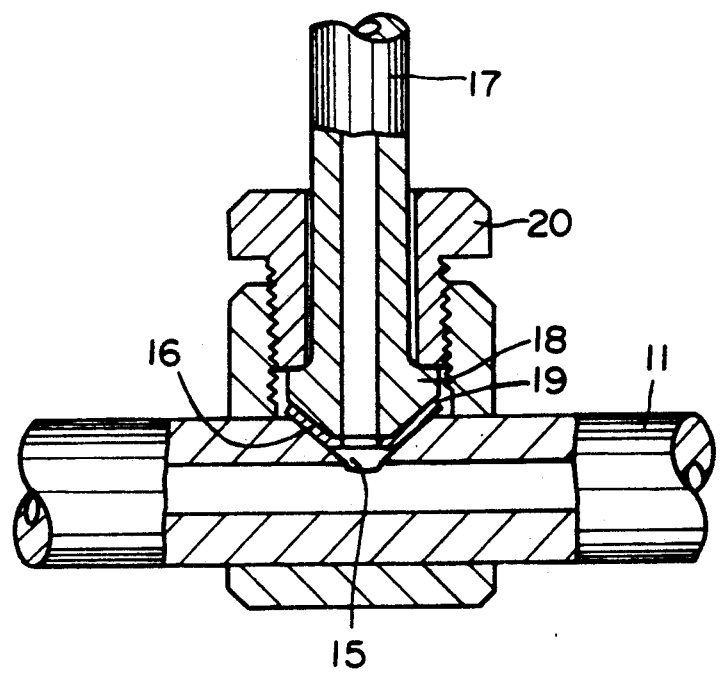
Figure 12:
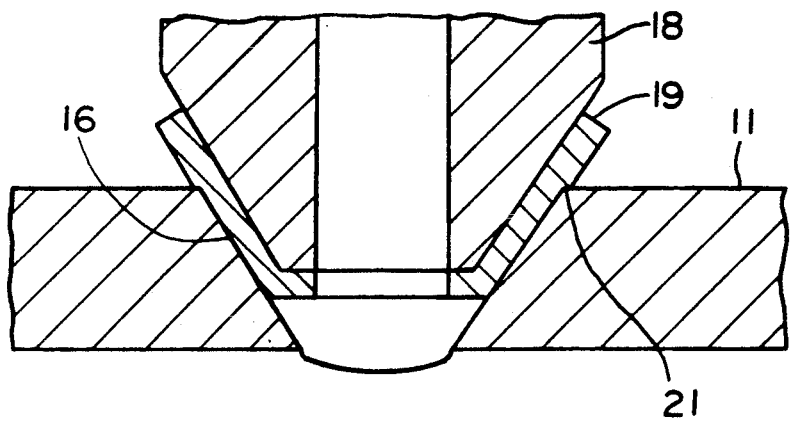
FIGS. 12 and 13 are diagrams illustrating deformed states of connection structures of prior art.
Figure 13:
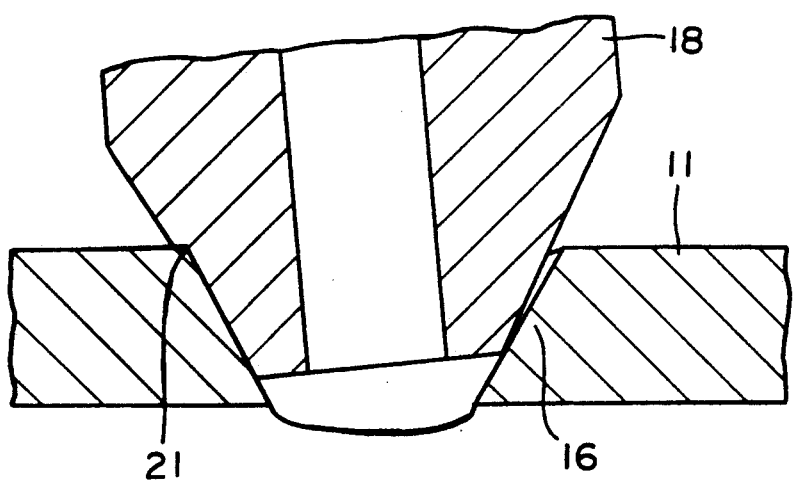

FIG. 9 is a diagram illustrating a fuel block used as a fuel rail of the present invention in place of the main pipe used in the other embodiments. In this embodiment, through passages (31) and (32) serving to pass a high-pressure fuel are formed in a thick-walled block (30), wherein installation holes (33a through 33d) and (34a through 34d) are formed so as to communicate with the through passages.

When this fuel block (35) is used as a fuel rail, branching connectors are fasted and fixed in the respective installation holes (33a through 33d) and (34a through 34d) by means of a clamping nut on a threaded portion formed on the inner circumference of the installation holes.

As described above, the connection structure for branching connectors of the present invention precludes the possibility of the pressure bearing surface of the pressure head portion of the branching connector or the sealing member being penetrated by the outer edge of the pressure receiving bearing surface by having the pressure receiving bearing surface on the side of the fuel rail consist of two tapered surfaces of different angles of inclination or having the outwardly opening terminal periphery of the pressure receiving bearing surface on the side of the fuel rail be formed in the shape of a substantially circular arc surface, thereby surface pressure on the sealing surfaces being increased to provide a greater sealing effect and greater resistance to pressure, thus permitting the connecting function of the branching connector to be maintained for long periods of time without reduction in sealing performance even in a state exposed to repeated application of a super-high fluid pressure and to incessant vibrations and allowing high reliability and safety to be ensured as a connection structure for a branching connector in a high-pressure fuel rail.

What is claimed is:

1. A connection structure for a branching fitting in a high-pressure fuel rail, said fuel rail having an elongated cylindrical peripheral wall defining an outer periphery and an axially extending through passage, a plurality of radially aligned through holes being formed at a plurality of positions in the axial direction in the peripheral wall of the fuel rail and communicating with the through passage formed axially in said fuel rail and serving to pass a high-pressure fuel, a plurality of elongated branching connectors connected orthogonally to the fuel rail at the respective through holes therein, each said branching connector having a flow path defined axially therein communicating with the respective through hole and the axially extending through passage of the fuel rail, each said branching connector further having a terminal end defining a pressure head portion defined by a surface of revolution about the axis of the respective branching connector, and wherein each said through hole is defined by a an outwardly opening pressure receiving bearing surface formed in said peripheral wall around the through hole, each said pressure receiving bearing surface being abutted by the pressure head portion formed on the corresponding branching connector, said pressure receiving bearing surface being formed to define a surface of revolution about the axis of said through hole, such that said pressure head portion of said branching connector and said pressure receiving bearing surface of said fuel rail abut to define a line of contact which is circular, and relief portions extending between the outer periphery of the fuel rail and each outwardly opening pressure receiving bearing surface, said relief portions being elongated with portions disposed at least on opposite respective sides of each said through hole in the longitudinal direction of said fuel rail, whereby said relief portions enable efficient sealing of the pressure head portion to the pressure receiving bearing surface without damage to the pressure head portion for both aligned and misaligned branching connectors.

2. The connection structure for the branching connector in the high-pressure fuel rail according to claim 1, wherein each said relief portion consists of at least two intersecting taper surfaces of different angles relative to the outer periphery of the fuel rail, the two taper surfaces comprising an outer taper surface which defines a smaller angle relative to the outer periphery of the fuel rail than an inner taper surface of said relief portion.

3. The connection structure for branching connector in the high-pressure fuel rail according to claim 1, wherein the opposed relief portions at each said through hole are aligned to intersect one another at an angle of inclination which is approximately 65° to 120°, while opposed portions of the pressure receiving bearing surface are aligned to intersect one another at an angle of inclination which is approximately 60°.

4. The connection structure for the branching connector in the high-pressure fuel rail according to claim (1), wherein said relief portion consists of a substantially circular arc surface formed on the outwardly opening terminal periphery of the pressure receiving bearing surface.

5. The connection structure for the branching connector in the high-pressure fuel rail according to claim 1, further comprising a plurality of joint pieces surrounding the fuel rail adjacent each said through hole therein, each said joint piece having a threaded wall defining an aperture aligned with the corresponding through hole and into which an associated one of said branching connectors extends, and wherein the branching connector is connected to the fuel rail by causing a nut incorporate din the threaded wall formed on said joint piece to be meshed with and tightened on the joint piece so as to enclose said fuel rail by said joint piece and said branching connector.

6. The connection structure for the branching connector in the high-pressure fuel rail according to claim (1), wherein each relief portion consists of a conical surface.

7. The connection structure for the branching connector in the high-pressure fuel rail according to claim (1), wherein the branching connector consists of a branch pipe.

8. The connection structure for the branching connector in the high-pressure fuel rail according to claim (1), wherein the fuel rail consists of a fuel manifold.

9. The connection structure for the branching connector in the high-pressure fuel rail according to claim 1 wherein said relief portions for each said through hole define two spaced apart relief portions disposed on opposite respective sides of each said through hole in the longitudinal direction of the fuel rail, such that the outer periphery of the fuel rail directly intersects the pressure receiving bearing surface of each said through hole at locations intermediate the spaced apart relief portions of each said through hole.

10. The connection structure for the branching connector in the high-pressure fuel rail according to claim 1 wherein the relief portions of each said through hole define a continuous relief portion intermediate the pressure receiving bearing surface of the through hole and the outer periphery of the fuel rail, the relief portions on opposite respective sides of each said through hole in the longitudinal direction of said fuel rail being larger than portions on opposite respective sides of each said through hole in the lateral direction of said fuel rail.

11. A connection structure for a branching fitting in a high-pressure fuel rail, said fuel rail having an elongated cylindrical peripheral wall defining an outer periphery and an axially extending through passage, a plurality of radially aligned through holes being formed at a plurality of positions in the axial direction in the peripheral wall of the fuel rail and communicating with the through passage formed axially in said fuel rail, a plurality of elongated branching connectors connected orthogonally to the fuel rail at the respective through holes therein, each said branching connector having a flow path defined axially therein communicating with the respective through hole and the axially extending through passage of the fuel rail, each said branching connector further having a terminal end defining a pressure head portion defined by a surface of revolution about the axis of the respective branching connector, each said through hole being defined by an outwardly opening pressure receiving bearing surface formed in said peripheral wall around the through hole and being formed to define a surface of revolution about the axis of said through hole, each said pressure head portion of said branching connector abutting said pressure receiving bearing surface of said fuel rail at a line of contact which is circular, and relief portions extending between the pressure receiving bearing surface of each said through hole and the outer periphery of the fuel rail, said relief portions being elongated with portions disposed at least on opposite respective sides of each said through hole in the longitudinal direction of said fuel rail, each said relief portion being defined by a plurality of intersecting surfaces with the radially outer surfaces of each relief portion being aligned at smaller angles to the outer periphery of the fuel rail then radially inner surfaces of each said relief portion, whereby said relief portions enable efficient sealing of the pressure head portion to the pressure receiving bearing surface without damage to the pressure head portion for both aligned and misaligned branching connectors.

12. A connection structure as in claim 11 wherein the intersecting surfaces of each said relief portion define intersecting conically generated surfaces.

13. A connection structure as in claim 11 wherein the intersecting surfaces of each said relief portion define intersecting arcuate surfaces.

14. A connection structure as in claim 11 wherein the relief portions for each said through hole are spaced from one another and are disposed on opposite respective sides of each said through hole in the longitudinal direction of said fuel rail, such that the outer periphery of the fuel rail intersects the pressure receiving bearing surface of the through hole at spaced apart locations in the lateral direction of said fuel rail.

15. A connection structure as in claim 11 wherein the relief portions for each said through hole define a continuous relief portion extending entirely about the through hole and extending between the associated pressure receiving bearing surface and the outer periphery of the fuel rail, areas of the continuous relief portion disposed on opposite respective sides of the respective through hole in the longitudinal direction of the fuel rail being larger then remaining areas of the relief portions.

* * * * *